Nov. 12, 1968  F. KUHLMANN ETAL  3,410,370
BRAKING DEVICE FOR CARRIAGE-TYPE DRAFTING MACHINES
Filed Nov. 28, 1967  2 Sheets-Sheet 1

Inventors
FRANZ KUHLMANN
OTTO WACKERFUSS
BY Edwin E. Greigg
Attorney

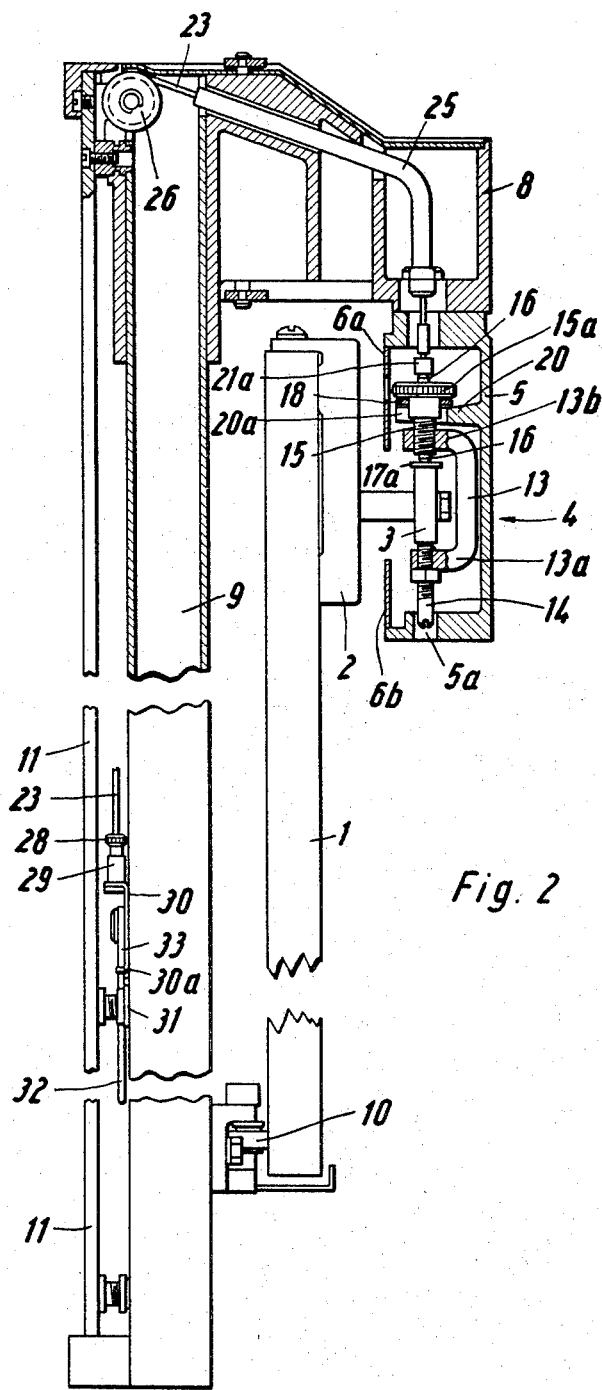

United States Patent Office 3,410,370
Patented Nov. 12, 1968

3,410,370
BRAKING DEVICE FOR CARRIAGE-TYPE
DRAFTING MACHINES
Franz Kuhlmann and Otto Wackerfuss, Wilhelmshaven,
Germany, assignors to Franz Kulhmann K.G., Prazisionsmechanik und Maschinenbau, Wilhelmshaven, Germany, a corporation of Germany
Original application Feb. 21, 1966, Ser. No. 528,881.
Divided and this application Nov. 28, 1967, Ser. No. 686,041
10 Claims. (Cl. 188—42)

ABSTRACT OF THE DISCLOSURE

A braking device for immobilizing a carriage with respect to a trackway on which the carriage is slidably mounted, said device includes a yoke surrounding the trackway and carrying two diametrically opposed and axially aligned brake shoes, lever and support means so connected to said yoke and to one of said brake shoes that upon actuation of the lever, the yoke and one brake shoe move as a unit, while the other brake shoe moves oppositely thereto; the two brake shoes are adapted to engage the trackway simultaneously at two opposed locations spaced from one another transversely to the direction of travel of said carriage.

This application is a division of application Ser. No. 528,881, filed Feb. 21, 1966, entitled, "Carriage-type Drafting Machine" now abandoned.

Background of the invention

The invention relates to a braking device particularly for a carriage-type drafting machine wherein said device is of the type including brake shoes which, upon actuation, are adapted to move against a resetting force in a plane normal to the longitudinal axis of a trackway and frictionally engage two opposed edges thereof.

Devices of the aforenoted type are known wherein to the carriage there are affixed for pivotal motion two two-armed levers adapted to move in a plane normal to the longitudinal axis of the trackway. The lever faces turned towards the trackway constitute the brake shoes; they are urged away from one another by a return spring. For actuating this braking device, there is provided a bolt displaceable normal to the trackway and provided with a conical terminus which, upon actuation, forces apart the two other arms of the levers causing the brake shoes to move towards one another and engage opposed edges of the trackway.

Several disadvantages are inherent in a brake mechanism of the type outlined above. In the first place, the draftsman has to perform a very precise brake adjustment which, however, in no way ensures that both levers will be exposed to the same pressure by the conical bolt so that the brake shoes engage the trackway with the same frictional force. As a result of such inequalities, upon actuation, at first only one of the brake shoes will engage the trackway and only after an additional forced displacement of the conical bolt will the other brake shoe assume its operative position and frictionally engage the trackway. This results not only in a very poor braking effect, but also causes deforming or tilting of the trackway with respect to the carriage or of the carriage with respect to the trackway. It is readily apparent that such a deformation or misalignment in a precision instrument such as a drafting machine not only impairs an exact guiding of the drafting head and thus leads to inaccuracies in the drawings, but also causes permanent deformations and damage to the drafting machine. Due to the pivoting arrangement of the levers, a high precision in the manufacture and assembly of axes and braking faces is required if an areal contact is to be achieved between the brake shoes and the edge faces of the trackway. In most cases, however, linear rather than areal engagement is effected between the brake shoes and the trackway so that relatively large forces and thus sudden locking result which unduly increase the wear of the instrument. Also, the torsion forces exerted by the conical terminus of the bolt to the levers unfavorably affect their positioning and in general are not advantageous for the proper functioning of the braking device.

Summary of the invention

Briefly stated, in order to avoid the aforenoted disadvantages, there is provided a braking device for carriage-type drafting machines comprising a U-shaped yoke partially surrounding the trackwey and adapted to move perpendicular to the length dimension thereof. The yoke has two legs each extending over opposed edges of the trackway and each containing a brake shoe. One brake shoe moves with the yoke as a unit, while the other brake shoe is movable relative thereto. The yoke and the relatively movable brake shoe are connected to the same actuating lever in such a manner that upon actuation of the lever by means of a manually operable braking cable, the forces imparted by the lever to the yoke and the relatively movable brake shoe cause an oppositely directed displacement thereof. Upon actuation the two axially aligned brake shoes simultaneously engage opposed edges of the trackway in two parallel planes.

The novel braking device does not require parts machined with a precision that has been essential in braking devices known heretofore. Yet, after simple adjustment it ensures a simultaneous engagement of the brake shoes with opposed edges of the trackway with uniform force so that no tilting or deformation will occur.

The invention will be better understood from the ensuing detailed specification taken in conjunction with the drawings.

Brief description of the drawings

FIG. 2 is a sectional view taken along line II—II of FIG. 1.

Description of the embodiment

Figures 1, 3:
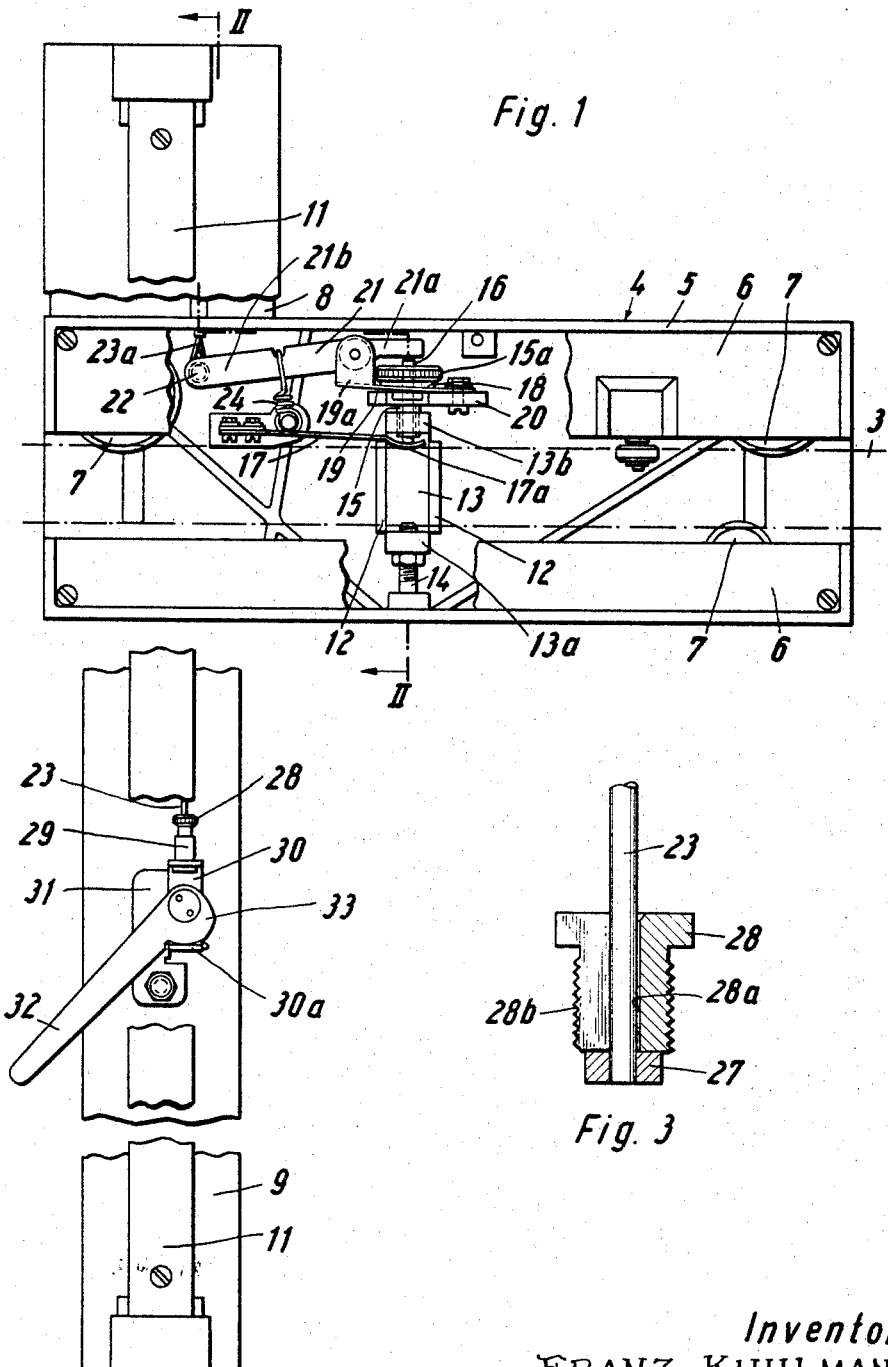
FIG. 1 is a side elevational view of the inventive braking device with the housing partially broken away.
FIG. 3 is an enlarged sectional view of a detail shown in FIGS. 1 and 2.

Turning now to FIGS. 1 and 2, there is shown a drafting board 1 to which there is secured by means of a bracket 2 a horizontal trackway 3 for guiding and supporting a carriage 4 having a housing 5, cover plates 6a, 6b, and track-engaging wheels 7. To the carriage 4 there is secured by means of a block 8 a guide frame 9 which engages the drafting board 1 by means of roller 10 and to which there is secured a vertically extending guide rail 11 for receiving a vertically slidable drafting head (not shown).

Within housing 5 there are formed two guiding strips 12 between which there is vertically slidably held a U-shaped yoke 13 having horizontally extending lower and upper legs 13a and 13b, respectively. The yoke 13 extends transversally with respect to trackway 3 and partially surrounds the latter in such a manner that legs 13a and 13b extend, with a clearance, over the lower and the upper edges of trackway 3. The lower leg 13a of the yoke 13 is provided with a bore which threadedly receives a brake shoe 14, the lower free end of which is provided with a slot engageable, for adjustment purposes, by a screw-driver which may be introduced through orifice 5a of housing 5. The upper free face of brake shoe 14 is adapted to directly engage the lower horizontal edge of the trackway 3. The upper leg 13b of the yoke 13 is provided with a bore which threadedly engages an axially hollow bushing 15 provided at its upper end with a collar 15a which is externally knurled for facilitating the adjustment of the bushing with respect to leg 13b. Through bushing 15 there extends a brake shoe 16 which is in axial alignment with brake shoe 14 and which is slidable with respect to bushing 15 transversally to trackway 3. The lower free face of brake shoe 16 is adapted to function as a braking face associated with the upper horizontal edge of trackway 3. A leaf spring 17 secured to housing 5 extends towards yoke 13 substantially parallel with trackway 3. The free arcuate end 17a of spring 17 projects between the braking face of brake shoe 16 and the trackway 3 urging the brake shoe 16 upwardly and away from trackway 3. As will be described later, the underside of arcuate end 17a is adapted to frictionally engage the upper edge of trackway 3 over a relatively large area.

Associated with bushing 15 is a carrier arm formed by a spring portion 18 and a rigid portion 19. One end of spring portion 18 is fixedly secured to a support 20 which, in turn, is integral with housing 5. Spring portion 18 acts as a hinge permitting carrier arm 18, 19 to be displaced in a vertical plane. The bushing 15 is suspended from an opening in arm 18, 19 by virtue of collar 15a and extends downwardly through an opening 20a in support 20.

To the rigid portion 19 of carrier arm 18, 19 there is secured a bracket 19a in which journals a lever 21. Bracket 19a divides said lever into arms 21a and 21b. Arm 21a extends over the carrier arm 18, 19 and is adapted to engage the upper end of the brake shoe 16. Lever arm 21b carries at its end a securing pin 22 to which there is hooked the terminal loop 23a of a braking cable 23. Intermediate between the bracket 19a and the securing pin 22, the arm 21b is engaged by a tension spring 24, the other end of which is secured to the housing 5. The spring 24 urges lever 21 counterclockwise.

The braking cable 23 extends within a tube 25 through the block 8, is trained about a pulley 26 and runs between the guide frame 9 and the rail 11.

Turning now to FIG. 3, the end of the cable 23 is secured, e.g. by soldering, to a disc-shaped nipple 27 which, in the direction of tensioning forces, is in engagement with the lower face of a support bushing 28 having an axial bore 28a. A longitudinal slot 28b provided in bushing 28 permits a lateral introduction of braking cable 23 into the bore 28a.

The support bushing 28 is provided with an external thread which is in engagement with a complemental internal thread of a stub 29 secured to a slider 30 adapted to be displaced in the direction of pull and release. The slider 30, which terminates in an offstanding follower 30a, is guided by a support plate 31 secured to the guide frame 9. On support 31 journals a brake manipulating lever 32 having a head portion formed as an eccentric or cam 33 for displacing slider 30 by engagement with follower 30a.

*Operation of the embodiment*

The precedingly-described embodiment operates in the following manner.

When the manipulating lever 32 is in its upper position, the eccentric 33 is turned away from follower 30a and consequently the brake cable 23 is slack; the braking device is in its released condition. The lever 21 is, by virtue of spring 24, in its extreme counterclockwise position in which the lever arm 21a has no effect on the brake shoe 16 which, in turn, is held spaced from the trackway 3 by means of leaf spring 17. Thus, between the underside of the leaf spring 17 and the upper edge of the trackway 3 there is provided a small gap constituting a braking clearance between the brake shoe 16 and the trackway 3. Urged by the cantilevered spring 18, the carrier arm 18, 19 lies flat against the support 20. The guide bushing 15 with yoke 13 secured thereto is suspended by collar 15a from the mid-portion of carrier arm 18, 19 which thus carries the weight of both the yoke and the bushing. The yoke 13 is in its lowest position; consequently, there is no engagement between the brake shoe 14 held in the lower leg 13a and the lower edge of trackway 3. Thus, the carriage 4 may be displaced freely along the trackway 3 across the draftboard 1.

If now it is desired to lock the carriage 4 on trackway 3 so that, for example, vertical lines may securely be drawn by sliding the drafting head (not shown) along rail 11, the brake manipulating lever 32 is actuated to cause a downward movement of the slider 30 by the rotating eccentric 33. As a result, the cable 23 is tensioned and the pulling force, overcoming the force of spring 24, causes lever 21 to journal clockwise in bracket 19a. Thus, arm 21a moves downward and displaces brake shoe 16 against the force of the leaf spring 17 forcing the latter into braking contact with the upper edge of trackway 3. The reaction force exerted by brake shoe 16 on arm 21a lifts bracket 19a and carrier arm 18, 19 which, as set forth hereinbefore, is resiliently and hingedly secured to support 20 by the cantilevered spring portion 18. With carrier arm 18, 19 the bushing 15 and yoke 13 suspended therefrom are also lifted and, as a result, the brake shoe 14 carried by leg 13a of yoke 13 is urged into frictional contact with the lower edge of trackway 3. By virtue of the pivotal coupling between carrier arm 18, 19 and the lever 21, the forces directed against the trackway 3 are entirely balanced between the brake shoe 16 and the yoke 13 carrying the brake shoe 14. With proper adjustment of brake shoe 14 and bushing 15 the frictional braking engagement of brake shoe 14 with the lower edge of trackway 3 will occur at the same time and with the same force as the braking engagement between spring end 17a and the upper edge of trackway 3. As a result tilting or deformation between the trackway 3 and the carriage 4 or the braking device may not occur.

That which is claimed is:

1. A braking device contained in a carriage adapted to move along a trackway, said device is of the type having brake shoes movable towards one another against a resetting force in a direction normal to the length dimension of said trackway for frictionally engaging two opposed, parallel edges thereof, the improvement comprising:
   (A) a yoke at least partially surrounding said trackway in a spaced relation therefrom and adapted to be displaced normal to the length dimension thereof, said yoke having
      (1) one leg extending over one of said edges of said trackway and being spaced therefrom,
      (2) another leg extending over the other of said edges and being spaced therefrom,
   (B) a first brake shoe mounted in said one leg and displaceable with said yoke as a unit,
   (C) a second brake shoe aligned with said first brake shoe and extending through said other leg, said second brake shoe slidable with respect to said yoke normal to the length dimension of said trackway, and
   (D) operating means adapted, when actuated, to simultaneously impart a pair of oppositely directed forces to said second brake shoe and to said yoke to displace said first and second brake shoes towards one another and urge them into braking engagement with said parallel edges of said trackway.

2. A braking device as defined in claim 1 including a leaf spring having one end secured to said carriage and another end provided with an arcuate terminus extending between said second brake shoe and said other edge of said trackway, said leaf spring urging said second brake shoe away from said trackway.

3. A braking device as defined in claim 1, wherein said first brake shoe is adjustable with respect to said one leg in a direction normal to the length dimension of said trackway.

4. A braking device as defined in claim 1 including a bushing held by said other leg and carrying said yoke, said second brake shoe extending through said bushing and held slidably thereby.

5. A braking device as defined in claim 4, wherein said bushing is adjustable with respect to said other leg in a direction normal to the length dimension of said trackway.

6. A braking device as defined in claim 4 including a movable carrier arm having one end secured to said carriage, said bushing extending through said carrier arm and being suspended therefrom, said operating means includes a lever pivotally secured to said carrier arm and divided into a first and a second lever arm, said first lever arm extending over said second brake shoe, an operating cable secured to said second lever arm, said first lever arm, when actuated by said cable, imparts a force to said second brake shoe displacing it towards said trackway, said lever simultaneously imparts a force to said carrier arm moving it away from said trackway and resetting means imparting a force to said lever opposed to the actuating forces of said cable.

7. A braking device as defined in claim 6, wherein said one end of said carrier arm is formed as a spring acting as a hinge for said carrier arm and opposing the force imparted by said lever to said carrier arm.

8. A braking device as defined in claim 1, wherein said trackway is horizontally secured to a drafting board, a guide frame rigidly affixed to said carriage and extending substantially parallel with said drafting board, an operating cable, one end of which is secured to said operating means, the other end of which is secured to a slider slidably mounted on said guide frame, a manipulating lever swingably held on said frame, an eccentric cam integral with said manipulating lever and adapted to impart a sliding motion to said slider to cause tensioning and slackening of said cable depending upon the direction of moving said manipuating lever.

9. A braking device as defined in claim 8 including a pulley about which said cable is trained to cause it to extend adjacent and parallel to said guide frame.

10. A braking device as defined in claim 8 including an axially hollow bushing secured to said slider and adapted to move therewith as a unit, said cable extending through said bushing, said other end of said cable is fixedly secured to a nipple engaging one end face of said bushing, a slot provided along the entire length of said bushing permitting a lateral insertion of said cable into said bushing.

References Cited
UNITED STATES PATENTS

| | | |
|---|---|---|
| 1,177,707 | 4/1916 | Jones. |
| 1,972,367 | 9/1934 | Willard _____ 188—42 |
| 2,297,589 | 9/1942 | Tackett _____ 188—30X |

DUANE A. REGER, *Primary Examiner.*